June 7, 1932.  C. G. ROSS  1,861,881
SAFETY BRAKE
Filed Feb. 7, 1930
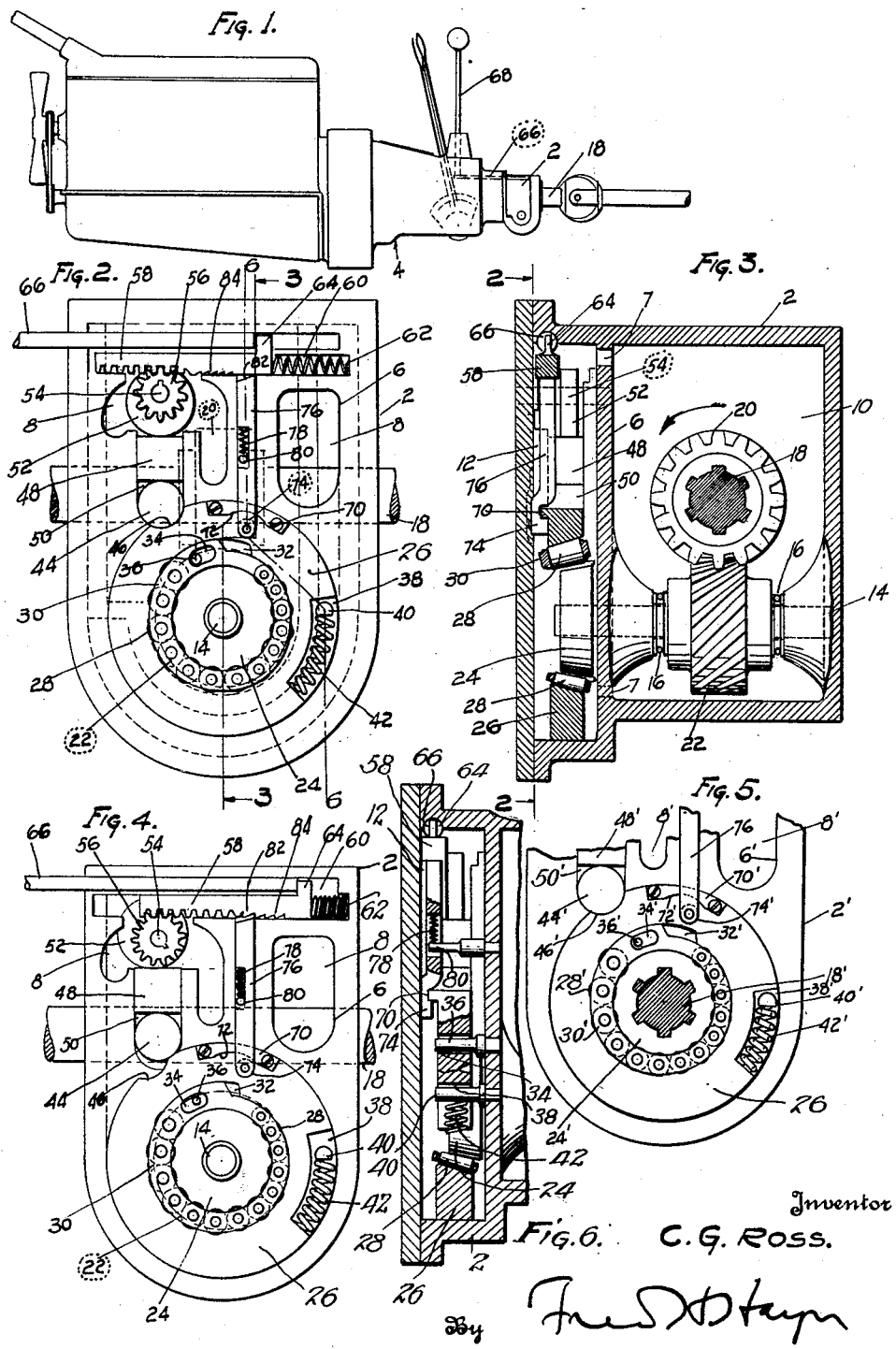
Inventor
C. G. Ross.

Patented June 7, 1932

1,861,881

UNITED STATES PATENT OFFICE

CHARLES G. ROSS, OF LOS ANGELES, CALIFORNIA, ASSIGNOR OF ONE-FOURTH TO J. A. EARHUFF, OF LOS ANGELES, CALIFORNIA, AND ONE-FOURTH TO VICTOR L. KONIGSMARK, OF LOS ANGELES, CALIFORNIA

SAFETY BRAKE

Application filed February 7, 1930. Serial No. 426,557.

My invention relates to safety brakes, and more particularly to brakes adapted for special use in connection with motor vehicles, which brakes become automatically operative when said vehicles are positioned on an incline, the reverse movement of said vehicles by gravity causing said brakes to function to make brake application.

It accordingly is an object of my invention to provide a novel form of safety brake mechanism, preferably associated with the drive shaft of a motor vehicle, which mechanism upon reverse movement of said shaft by gravity will cause a drum shaft to shift automatically so said drum will engage a brake application means, preferably in the shape of a roller housing, so said rollers will engage and effectively hold said drum, and hence said drive shaft, against movement, said drum being automatically disengaged upon forward movement of said drive shaft, when the vehicle is placed in gear.

A further object of my invention is to provide a novel form of emergency brake release mechanism, preferably associated with the gear shift of the motor vehicle, so the drive shaft may be reversed or the safety brake released when the car has been parked, said mechanism preferably comprising a movable locking ring associated as desired with the safety brake, a plural releasing means, which may take the form of a spring-operated pawl, having a hair trigger operation engaging said ring to move the same, and a set of reciprocating and rotary elements, preferably actuated by a rack and pinion, which rack is engageable by said pawl.

The above and further objects and advantages of my invention, as will hereinafter more fully appear, I attain by the construction described in the specification, and illustrated in its preferred form on the drawing, forming a part of my application.

Reference is had to the accompanying drawing, in which similar reference characters denote similar parts. In the drawing, Fig. 1 is a fragmentary side elevational view of a motor vehicle showing my invention applied thereto, Fig. 2 is a cross-sectional view, taken on the line 2—2 of Fig. 3, looking in the direction of the arrows, Fig. 3 is a similar view, taken on the line 3—3, Fig. 2, also looking in the direction of the arrows, Fig. 4 is a view similar to Fig. 2, but on a somewhat smaller scale, showing the release mechanism in the position assumed when said mechanism has been manually released, Fig. 5 is a fragmentay view, similar to Fig. 2, but showing a modification in which the brake drum has been placed directly on the drive shaft, and Fig. 6 is a cross-sectional view, taken on the line 6—6, Fig. 2.

Describing my invention more in detail, in its broader aspects said invention comprises a brake drum placed either directly on a drive shaft, or on a subsidiary or stub shaft, operable from said drive shaft, a roller carrying housing being associated with said drum, which housing is adapted to carry a set of rollers, which rollers, when said drive shaft is reversed, are adapted to engage and hold said drum, and said drive shaft stationary, and when said drive shaft is given a forward movement, said drum is adapted to rotate on said rollers, causing said rollers to release said drum automatically.

It is also desirable to provide a release mechanism for said brake, whereby, when the motor vehicle, with which my invention is adapted to be associated, is parked, or it is desired to reverse the motor of said vehicle, the brake may be manually released by a means, associated with the gear shift of the vehicle, if desired.

Said manual release mechanism preferably comprises a spring-pressed ring surrounding the roller housing and movable on said rollers, any preferred mechanism, such as a rack and pinion, operable by the gear shift lever, which pinion causes a set of devices, such as an eccentric, follower and roller, to permit said ring to operate a holding device, such as a spring-pressed pawl to lock said rack in position, so the vehicle may be moved, or the motor reversed, said pawl having a hair trigger operation.

More specifically, my invention comprises a suitable housing 2, positioned at any convenient point on the motor vehicle 4, when said invention is applied to such vehicles as shown in Fig. 1, said housing, if desired, being provided with a partition 6, which partition may have any preferred number of openings 8 for the purpose of obtaining as light a structure as possible.

The partition 6 defines a pair of compartments 10 and 12 (Fig. 3), and in the compartment 10 is positioned the stub or subsidiary shaft 14, mounted for rotation in suitable anti-friction bearings 16, and also capable of a slight axial movement in said bearings, which bearings may assume any form in practice preferred.

To lubricate the movable parts in both the compartments 10 and 12, I may provide the partition 6 with upper and lower openings or passages of suitable size 7 so any lubricant placed in the compartment 10 may be splashed from the compartment 10 through the upper passage 7 and returned to said compartment through the lower passage 7.

As seen more particularly in Fig. 2 the drive shaft 18 of the motor vehicle extends through the housing 2, and has mounted thereon in any preferred way a suitable driving device, such as the gear 20, which gear is in mesh with any other suitable driven means, such as the spiral gear 22 mounted in any preferred way on the stub or subsidiary shaft 14, said shaft 14 extending through the partition 6, and has mounted thereon a brake drum 24. The forward movement of the drive shaft 18, and, of course, the gear 20, is indicated by the arrow in Fig. 3.

Positioned in the compartment 12, and surrounding the drum 24, is a roller carrying annular housing 30, which housing has mounted therein in any preferred way the rollers 28, which are constructed of progressively increased diameter, so the drum 24 may be held and locked under conditions presently to be explained.

Movement of the drive shaft 18 of the vehicle (and gear 20) in the direction of the arrow on Fig. 3, drives said shaft, and the vehicle with which is adapted to be associated, forwardly, the gear 22 and shaft 14, of course being driven therewith in the bearings 16. It will be understood that any means for driving the subsidiary or stub shaft 14 from the drive shaft 18 may be substituted for that shown and described, and still remain within the province of my invention.

Should the drive shaft 18 be reversed, due to gravity, as when the vehicle is standing upon a hill, and, due to the weight of the vehicle, which will have a tendency to move said vehicle down the hill, the gear 20 will be moved in a direction contrary to arrow shown on Fig. 3. This movement will cause the gear 22 to shift its shaft 14 slightly toward the left in Fig. 3, causing the brake drum 24 to engage the rollers 28, which, being of progressively increased diameter, embrace and hold said drum against movement. This effectively locks the drive shaft 18, and prevents the motor vehicle from moving down the incline or hill.

The amplitude of movement of the annular roller housing 30 is in practice quite slight, and may be as small as one thirty-second of an inch, in direct or reverse movement, said housing being movable in and relatively to a locking ring 26, so called since it coacts with the rollers 28 to hold the drum in the spiral opening 32, to be hereinafter more particularly described, said rollers being adapted to roll on the inner wall of said ring.

Should it now be desired to move the car forwardly it is merely placed in gear, giving the drive shaft 18 a forward movement in the direction of the arrow. This causes the drum 24 to rotate on the rollers in reverse movement than that previously described, and by reason of the progressively increased diameters of the rollers, automatically causing them instantly to release the drum 24.

It is not at all necessary to provide the subsidiary or stub shaft 14 and the gears 20 and 22, and the drum may be directly mounted on the drive shaft. Such a construction is shown in Fig. 5, where the drum 24' is directly mounted on the drive shaft 18', the rest of the structure being precisely the same as just described and as to the other features presently to be described.

In case it is desired to reverse the motor, or it is desired to move the car manually, as when it is parked, a special construction is provided. This construction is more particularly shown in Figs. 2, 3, 4 and 5.

Surrounding the roller housing 30, is a locking ring 26, which is provided with a spiral opening 32, said ring being movable on the rollers 28, and relative thereto, it being understood, of course, that the rollers 28 may move toward and away from the drum 24, even when the ring 26 is locked, and said ring may also move on said rollers to permit their brake release, as presently to be described.

The roller housing 30 may be provided with a slot 34 in which is positioned a pin 36 to limit the movement of said housing upon the movement of the rollers 28, the movement of which, from brake application to brake release, as hereinbefore stated, is a practice quite slight.

The locking ring 26 is cut away as at 38 (Figs. 2 and 4), and in said cut-away portion is mounted the abutment pin 40, a resilient means, such as the spring 42, constantly holding the ring 30 under tension against the pin 40.

The circumferential movement of the locking ring 26 is controlled by a mechanism which will now be described. Said mechanism comprises a roller 44, adapted to engage the ring 26 in a cut-out portion 46 (Fig. 4) therein, which functions to permit said roller 44, to hold said ring stationary.

Both the roller 44 and the follower 48, which may be an ordinary block of suitable dimensions, are operable in a way 50, in the casting of the partition 6, and the follower 48 is adapted to engage an eccentric 52, mounted upon a shaft 54 upon which is keyed the pinion 56.

The pinion 56 is in engagement with a rack 58 (Figs. 2 and 4), slidable in the way 60, against a resilient means, such as the spring 62, and the rack 58 has a projection 64, engaged by the rod 66, which may be secured to and operated by the gear shift lever 68 (Fig. 1) or otherwise.

Mounted in any preferred way on the locking ring 26 is a segment portion 70, which is cut away as at 72, which cut-away portion is adapted to be engaged by a roller 74 positioned on the lower end of a pawl 76, movable within the compartment 12. The pawl 76, at any convenient place is cut-away, and in said cut-away portion is positioned a spring 78, abutting said pawl and a pin 80, positioned in said cut-away portion. The upper end of the pawl 76 is beveled as at 82, which beveled portion is adapted to engage the notches 84 in the lower end of the rack 58.

Should it be desired to release the brake drum 24, while the car is parked, so it may be moved manually, or to reverse the car, the gear lever 68 is moved, which causes the rod 66 to engage the projection 64, moving the rack 58 against the tension of the spring 62. This causes the eccentric to be moved to the position shown in Fig. 4, the spring 42 causing the ring 26 to assist its return to initial position, the roller 44 being moved out of the cut-away portion 46 and the follower 48 pushed against the eccentric 52, as hereinafter more particularly described.

This movement causes the segment with its cut-away portion to move the roller 74 of the pawl 76 to permit said pawl by the action of the spring 78, to engage momentarily its beveled end 82 with one of the notches 84, holding the parts in position as shown in Fig. 4, the cutaway portion in said segment automatically causing the release of said pawl.

This causes a temporary lock of the parts, the action of the pawl 76 coacting with the roller 44 to permit the release of the brake rollers 28, while the roller 74 rides on the cut-away portion of the segment 70, which cut-away portion, as the locking ring 26 turns under the action of the spring 42, instantly causing the withdrawal of the pawl 76 from its engagement with one of the notches 84, making a hair trigger snap and release. This releases the rollers and the car may be moved or reversed.

For a forward movement of the car, the lever 68 is shifted, the springs 62 and 42 automatically causing the parts to assume the position shown in Fig. 2. It will be understood that the drum 24 may be braked and released, irrespective of the ring 26 and its appliances, as hereinbefore explained.

It will be noted from the foregoing that the mechanism is absolutely automatic in its action. Should the operator of the car desire to reverse said car, or back up, it will, of course, be necessary to shift the lever 68 so the gears will be placed in reverse position. The rod 66, being in practice associated with the lever 68 in any way desired, is operable only when gears are shifted for reverse movement, and never in any way for forward movement or forward shifts of the gears.

Assuming that the drum 24 is in locked position, caused by the engagement of the rollers 28 therewith, to reverse, it is necessary to release said rollers from said drum, so said drum will be permitted to run freely in a direction contrary to that which causes said drum to be locked, when reverse movement is not desired. The gear shift lever 68 is then moved to reverse position, causing the rod 66 to engage the projection 64. This moves the rank 58 against the tension of the spring 62, whereupon the pinion 56 is rotated to the position shown in Fig. 4.

This leaves an open space between the eccentric 52 and the follower 48; and when the drum 24, by reason of the reverse movement of the drive shaft, is forced into a counter-clockwise direction by said movement, said drum will force the rollers 28 into a counter-clockwise direction, bringing a pressure to bear upon said rollers, and at the same time permit the drum 24 to rotate freely therein.

This movement of the ring 26 will cause its cut-away portion 46 to force the roller 44, and the follower 48, against the eccentric 52, as depicted in Fig. 4, thus allowing a reverse movement of the vehicle.

Moving the lever 68 so as to place the reverse gear out of mesh, the rod 66 is free to move to its original position by the action of the compressed spring 62, thus permitting the ring 26, by aid of the compressed spring 42, to move to its initial position, which ring also assists such movement by the reason of the friction of the rollers 28, caused by the drum 24, when the car is moved forwardly.

From this it will be observed that the apparatus will not permit a motor vehicle to make a reverse movement unless the operator thereof shifts into reverse gear, said vehicle being held absolutely stationary even when positioned on a hill; and, should said operator attempt to move said vehicle manually, or by any other means than its own reverse gear shift, he would experience great difficulty.

Hence, the pawl 76 is provided. To reverse manually, the operator must first shift the gears into reverse, and from said position to neutral position. In making the reverse gear shift, as previously explained, the rod 66 is at the same time moved to engage the projection 64, causing the rack 58 to be moved against the tension of the spring 62, the pawl 76 by reason of the tension of the spring 78, engaging the ratchet 84. Therefore, said pawl, by reason of its beveled point 82, holds the rack 58 against the tension of the spring 62.

The function of said construction is to hold the rack 58 and the eccentric 52 from returning to locking position, and hence permiting the operator to place the gears in neutral, step out of the car, and push said car backwards, if it is desired to do so.

In manually pushing the car backwards, the identical action takes place on the drum 24, rollers 28, and the ring 26, as that when the car is reversed by the action of the motor. Hence the movement of the ring 26 causes the cam portion of the segment 70 to act on the roller 74, and instantly disengages the beveled end 82 of the pawl 76 from the rack 84, making a hair-trigger snap and release, causing the apparatus again to operate automatically, irrespective of the pawl 76. From this it will be seen that the pawl 76 is utilized only when the car is reversed by any other means than the power of its motor.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims:

I claim as my invention:

1. An automatic safety brake and release mechanism comprising a drive shaft adapted to be reversed by gravity, a combined brake shifting and brake release means on said shaft, a brake shaft, a combined shiftable braking and brake release means on said brake shaft, and a brake including rollers of progressively increased diameters associated with said brake shaft for braking said drive shaft when said drive shaft is reversed.

2. An automatic safety brake and release mechanism for motor vehicles including the drive shaft of said vehicle, of automatically operated brake application means including rollers of progressively increased diameters associated with said shaft for braking said shaft when said vehicle is on an incline and said shaft is reversed, and for automatically releasing said means when said vehicle is thrown into gear.

3. In a motor vehicle, mechanism for automatically making brake application on said vehicle by its gravity reverse movement when it is on an incline, and automatically releasing said brake application when said vehicle is thrown into gear, including the drive shaft of said vehicle, said mechanism comprising a brake shifting means including rollers of progressively increased diameters on said shaft adapted to be operated by the reverse movement of said shaft, a brake shaft, shiftable braking means on said brake shaft, and a brake associated with said brake shaft.

4. In a safety brake mechanism, a drive shaft, brake shifting means on said shaft adapted to be operated by the reverse movement of said shaft, a stub shaft positioned at right angles to said drive shaft, shiftable braking means secured to said stub shaft whereby said drive shaft may shift said stub shaft, and a brake on said stub shaft.

5. In a safety brake mechanism, a drive shaft, brake shifting means on said shaft, a brake shaft, shiftable braking means on said brake shaft, a brake associated with said brake shaft, both of said means being adapted to coact upon reverse movement of said drive shaft to make brake application thereon, and to release said brake upon forward movement of said drive shaft, and a manually operable release mechanism associated with said brake for releasing said brake so said drive shaft may be released.

6. In a motor vehicle, mechanism for automatically making brake application when said vehicle is standing upon an incline by its reverse movement, said mechanism including rollers of progressively increased diameters and automatically releasing said brake application when said vehicle is thrown into gear, and means associated with the gear shift of said vehicle for releasing said brake application so said vehicle may be moved.

7. In a safety brake mechanism, a drive shaft, a shiftable stub shaft juxtaposed to said drive shaft, means on said drive shaft for shifting said stub shaft in one direction when the movement of said drive shaft is reversed, and in the opposite direction when said drive shaft is moved forwardly, a brake associated with said stub shaft, and manual means associated with said brake for releasing said brake.

8. A brake comprising a shiftable shaft, a brake drum on said shaft, a brake housing surrounding said drum, and a set of rollers associated with said housing, said rollers being adapted to be engaged by said drum when brake application is made by shifting said shaft.

9. Brake release mechanism for a safety brake, said brake including a shiftable shaft and a brake drum thereon, said mechanism comprising a locking housing having an opening therein, a set of rollers of progressively increasing diameter associated with said housing and movable circumferentially therewith, said drum being adapted to be brought into engagement with said rollers when said shaft is shifted and means for moving said housing circumferentially through said rollers for releasing said rollers from engagement with said drum.

10. In a brake release mechanism for safety brakes including a shiftable brake drum, the combination of a movable roller housing associated with said drum, a set of rollers secured to said housing, a movable locking and release ring surrounding said housing, said ring having an inner surface engaging said rollers, means for opposing the movement of said ring, and manually operated means associated with said ring whereby said ring may be moved to cause said rollers to release said drum.

11. In a brake release mechanism for safety brakes including a brake drum, the combination of means for making brake application to said drum including rollers of progressively increased diameters, locking means for locking said brake application means, mechanism for releasing said locking means, and manual means for operating said mechanism.

12. In a brake release mechanism for a brake drum, the combination of brake application means associated with said drum including rollers of progressively increased diameters, locking means for locking said brake application means, and means for releasing said locking means, said means comprising plural means for engaging and moving said locking means.

13. In a brake release mechanism for a brake drum, the combination of brake application means for engaging said drum including a locking ring for locking said brake application means, and plural means for locking and unlocking said ring, one of said plural means comprising a reciprocating means for engaging and moving at least two of the other of said plural means.

14. An automatic safety brake and release mechanism comprising a drive shaft, and means including rollers of progressively increased diameters on said shaft for holding said shaft stationary when it is reversed by gravity, and for automatically permitting the release of said shaft when it is moved forwardly.

15. A brake holding and release mechanism comprising a rotatable drum, a housing surrounding said drum and a set of rollers of progressively increased diameter mounted in said housing, a ring surrounding said housing, said rollers being adapted to hold said drum stationary by engaging said drum and said ring when its direction of rotation is reversed, but when said drum is rotated forwardly, the rotation of said drum on said rollers will cause said rollers to release said drum.

16. A hair trigger release mechanism for a brake drum including a roller housing associated with said drum, and a spring pressed ring surrounding said housing, plural means associated with said ring, and adapted to coact therewith to cause said ring to release said brake drum by a hair trigger action, and lock said ring with respect to said housing after said ring has been released.

17. In a safety gravity-operated brake mechanism, a drive shaft adapted to be reversed by gravity, brake shifting means on said shaft, a brake shaft, shiftable braking means including rollers of progressively increased diameters on said brake shaft, and a brake associated with said brake shaft for holding said drive shaft when said drive shaft is reversed.

18. In a safety gravity-operated brake mechanism, a drive shaft adapted to be reversed by gravity, brake shifting means on said shaft, a brake shaft, shiftable braking means on said brake shaft, and a brake drum on said brake shaft for causing said shiftable braking means to make brake application on said drum when said drive shaft is reversed.

19. A brake comprising a shiftable drum, a housing surrounding said drum, a set of rollers of progressively increasing diameter mounted on said housing, a ring member surrounding said housing and provided with a spiral opening, and means for shifting said drum, said rollers, when said drum is shifted, being adapted to coact with said drum and the wall of said spiral opening to make brake application on said drum.

In testimony whereof I have signed my name to this specification.

CHARLES G. ROSS.